United States Patent [19]

Woodcock et al.

[11] Patent Number: 4,809,863

[45] Date of Patent: Mar. 7, 1989

[54] FILL NECK ASSEMBLY FOR ON BOARD REFUELING VAPOR RECOVERY SYSTEM

[75] Inventors: William F. Woodcock, Dearborn; William E. Ruhig, Jr., Sterling Heights, both of Mich.

[73] Assignee: Colt Industries Inc, New York, N.Y.

[21] Appl. No.: 108,958

[22] Filed: Oct. 16, 1987

[51] Int. Cl.$^4$ .............................................. B65D 6/12
[52] U.S. Cl. .............................. 220/85 F; 220/85 VR; 220/85 VS
[58] Field of Search ........... 220/85 F, 85 VR, 85 VS, 220/86 R, 85 V, 85 SP; 141/59, 291

[56] References Cited

U.S. PATENT DOCUMENTS

| | | | |
|---|---|---|---|
| 4,274,549 | 6/1981 | Germain | 220/85 VR |
| 4,630,749 | 12/1986 | Armstrong et al. | 220/85 VS |
| 4,714,172 | 12/1987 | Morris | 220/85 VS |
| 4,719,949 | 1/1988 | Mears | 220/85 VS |

*Primary Examiner*—Willis Little
*Attorney, Agent, or Firm*—Walter Potoroka, Sr.

[57] ABSTRACT

A fill neck assembly of a vehicle fuel tank fill pipe incorporates in a single housing valving arrangements employed in an on board refueling vapor recovery system which prevents fuel vapor displaced from the fuel tank during a refueling operation from being discharged into the atmosphere. A fuel passage through the housing and connected to the fill pipe incorporates a nozzle seal near its inlet which will sealingly receive a standard fuel dispensing nozzle to enable fuel to be discharged from the nozzle into the fuel passage while preventing fuel vapor from being discharged from the fuel passage into the atmosphere. Vapor displaced from the tank by the incoming fuel passes from the tank through an outer hose loosely surrounding the fill pipe into a second passage through the housing having a vapor-liquid discriminator, a float valve and a vapor valve whose outlet is connected to a vapor receiving canister. In one embodiment, the vapor valve is opened in response to the insertion of the fuel dispensing nozzle into the nozzle seal, in a second embodiment the vapor valve is opened when the pressure of fuel vapor exceeds a set pressure. Emergency pressure relief valves are also incorporated in the housing.

20 Claims, 2 Drawing Sheets

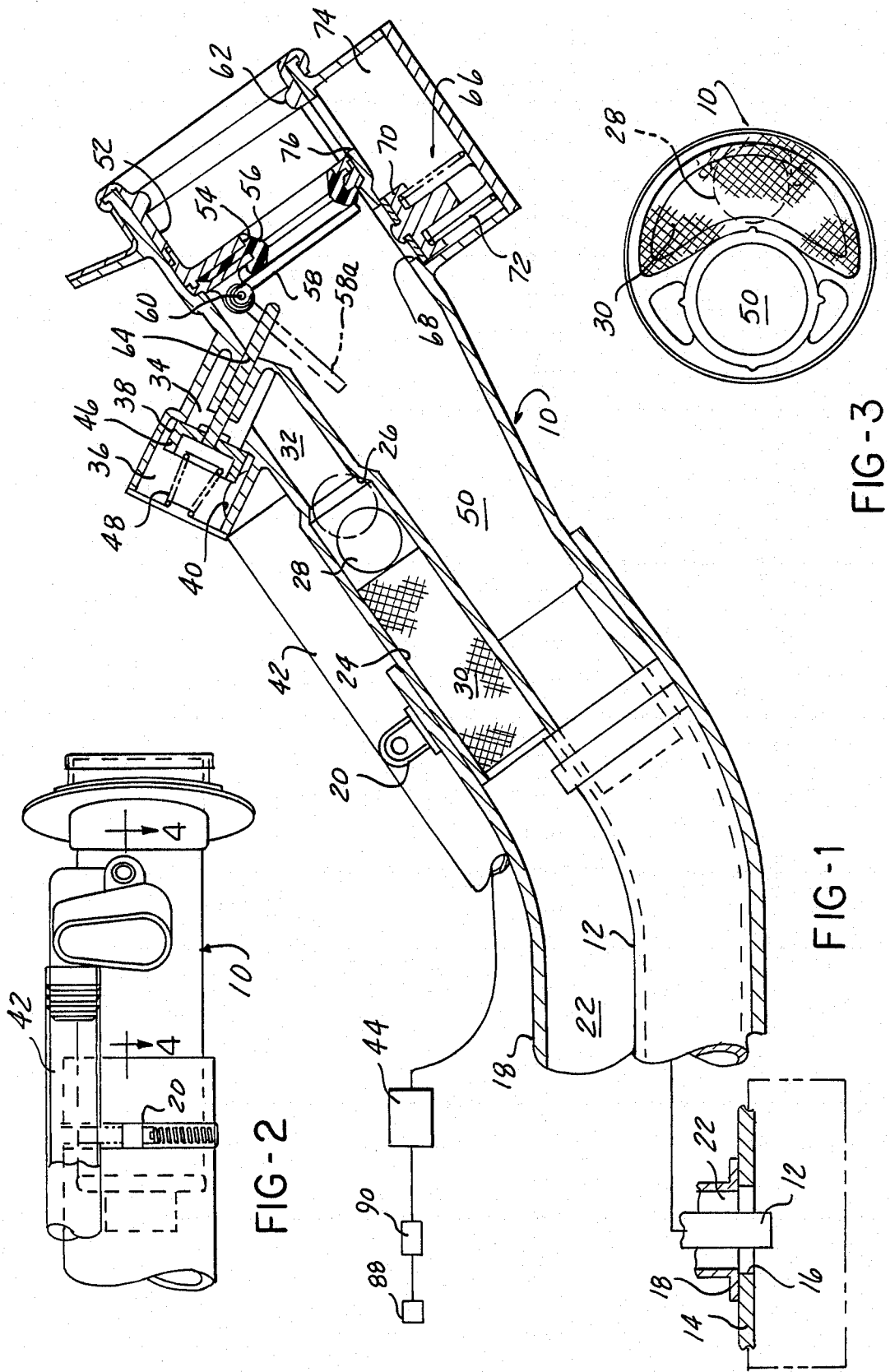

FILL NECK ASSEMBLY FOR ON BOARD REFUELING VAPOR RECOVERY SYSTEM

BACKGROUND OF THE INVENTION

The present invention is concerned with an on board refueling vapor recovery system for motor vehicles which functions to prevent fuel vapor displaced from the head space of the vehicle fuel tank during a refueling operation from being discharged into the atmosphere.

It is known in the prior art to provide a motor vehicle with an on board fuel vapor recovery system operable to prevent the emission of fuel vapor into the atmosphere via the fuel tank vent which functions to equalize pressure in the tank head space as fuel is withdrawn by operation of the vehicle engine. These prior art systems employ a vapor canister in the fuel tank vent line which will entrap the relatively small amount of fuel vapor expelled from the tank between refueling operations when the fuel vapor pressure within the tank exceeds atmospheric pressure. This prior art "running vapor" canister is connected to the intake manifold of the vehicle engine via a purge system which applies manifold vacuum to the canister to withdraw fuel vapor from the canister at a controlled rate for combustion in the engine. These particular prior art systems are designed with flow capacities which are totally inadequate to cope with the massive surge of fuel vapor displaced from the fuel tank during a refueling operation, and as a result vapor displaced by the incoming fuel is discharged into the atmosphere from the open end of the fuel tank fill pipe. In some states, service station fuel pumps are equipped with a system to recover this discharged fuel vapor.

In commonly owned co-pending application of Ser. No. 101,069 filed Sept. 25, 1987, there is disclosed a refueling vapor recovery system mounted on the vehicle which takes the form of a vapor flow passage and vapor receiving canister connected between the fuel tank and purge system in parallel with the fuel tank vent "running vapor" recovery system referred to above. This "on board" refueling vapor recovery system requires the provision of several additional components to the vehicle and space within the vehicle available for mounting these components and routing various conduits between the components is restricted and varies widely in location between various makes and models of vehicles.

Desirably, the active components, such as valves, of such a refueling vapor recovery system should be mounted at some location where they are reasonably accessible and closely adjacent each other to minimize the number of connections and conduits required to connect the components into the system.

The present invention is especially directed to a fill neck assembly physically located at the inlet end of the fuel tank fill pipe which incorporates in a single package the various valves, including emergency pressure relief valves, required by an on board refueling vapor recovery system.

SUMMARY OF THE INVENTION

In accordance with the present invention, a fill neck assembly takes the form of a housing mounted at the inlet end of the fill pipe of the vehicle fuel tank. Typically, this housing will be mounted within a rear fender of the vehicle where sufficient space is available or can be made available at a slight sacrifice to trunk space. A fuel passage through the housing is connected to the fuel tank fill pipe and a second relatively large diameter outer hose is sealed at its upper end to the housing in loosely surrounding relationship to the fill pipe and opens at its lower end into the head space of the vehicle fuel tank. The space between the fill pipe and outer hose constitutes an unrestricted fuel vapor flow passage which opens at its upper end to a vapor flow passage through the interior of the housing. The outlet of this vapor flow passage is connected by an external conduit to the refueling vapor canister which may be located in the vehicle at some point remote from the fill neck assembly.

At the inlet end of the vapor flow passage in the housing, a vapor-liquid discriminator in the form of a loosely packed or coarsely porous material is mounted. This discriminator presents a relatively small resistence to the flow of vapor, but will substantially retard the flow of liquid. A float ball is loosely received upon the top of the discriminator in a relatively large diameter vapor flow passage section which tapers inwardly at its upper end to a somewhat smaller diameter passage section so that if liquid rises in the vapor passage, the float will seat in the tapered passage section to block the flow of liquid into the smaller diameter passage section.

Above the float valve an on/off vapor valve is located in the vapor flow passage to normally block flow of vapor to the vapor outlet of the housing. In one form of the invention, the vapor valve is actuated to its open position by a trap door like plate in the fuel passage which is hinged to an open position by the insertion of a fuel dispensing nozzle of a service station pump into the fuel passage. In a second embodiment, the vapor valve takes the form of a flexible diaphragm which will automatically open to accommodate flow of vapor to the vapor outlet when the pressure of fuel vapor below the diaphragm exceeds a predetermined pressure.

The housing also incorporates an annular seal in the fuel passage adjacent its inlet end which will slidably engage the outer diameter of a standard fuel dispensing nozzle to seal the fuel passage against the discharge of fuel vapor into the atmosphere while accommodating the flow of fuel from the nozzle into the fuel passage during the refueling operation. An emergency pressure relief valve is incorporated in the housing to bypass this nozzle seal to permit fuel to spill from the housing inlet if, by inattention of the attendant or malfunction of the conventional automatic nozzle shutoff, the tank is overfilled. Fuel vapor in the fuel passage is vented within the housing to the vapor outlet by a vapor vent which will automatically seal if liquid attempts to flow through the vapor vent passage.

Other objects and features of the invention will become apparent by reference to the following specification and to the drawings.

IN THE DRAWINGS

FIG. 1 is a detail cross-sectional view of a fill neck assembly embodying the present invention combined with a schematic representation of other components;

FIG. 2 is a detail side elevational view of the fill neck assembly of FIG. 1;

FIG. 3 is an end view of the fill neck assembly of FIG. 1;

Figures 4, 5:
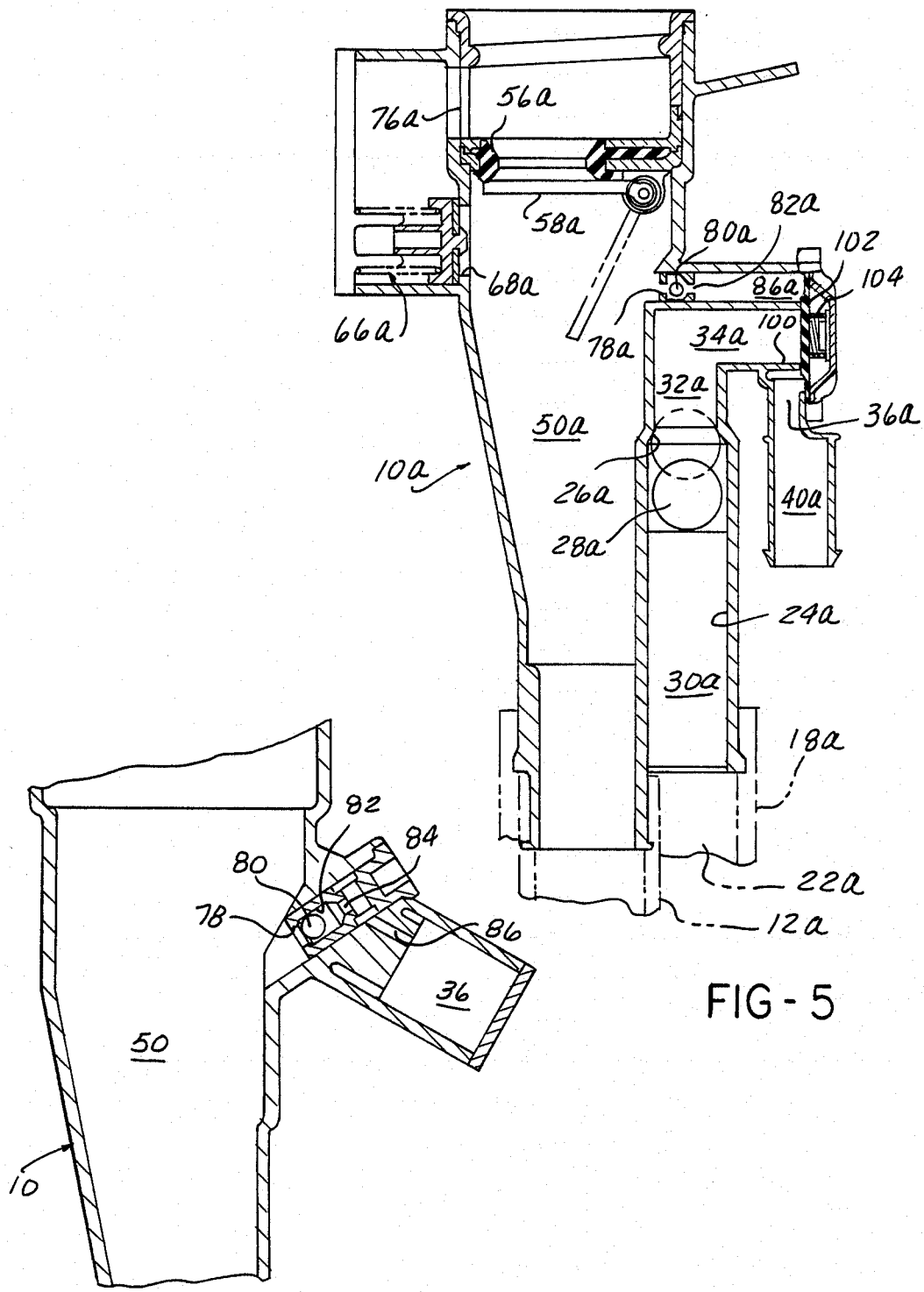
FIG. 4 is a detail cross-sectional view taken on line 4—4 of FIG. 2.
FIG. 5 is a detail cross-sectional view of a modified form of fill neck assembly.

Referring first to FIGS. 1-3, one form of fill neck assembly embodying the present invention includes a housing designated generally 10 adapted to be connected at its lower end to the upper end of the fill pipe 12 which conducts fuel into the fuel tank 14 of a motor vehicle. The lower end of fill pipe 12 opens into the interior of tank 14 through a somewhat enlarged opening 16. An outer hose 18 is sealed at its lower end to the top of fuel tank 14 and extends upwardly from the fuel tank in loosely surrounding relationship to fill pipe 12 and is sealingly clamped at its upper end to housing 10 as by a hose clamp 20. The space between the interior of outer hose 18 and the exterior of fill pipe 12 constitutes a substantially unrestricted vapor flow passage 22 through which fuel vapor may flow from the head space tank 14 into a vapor flow passage 24 formed within housing 10. Flow passage 24 includes an inwardly tapered float valve seat 26 defining a seat for a float ball 28 retained within passage 24 by a vapor-liquid discriminator 30. Discriminator 30 may take the form of any suitable loosely packed or coarsely porous material which fills passage 24 and presents a minimal resistance to the flow of vapor through the material, but will impose a reasonably substantial resistance or retardation to the flow of liquid through the discriminator.

A reduced diameter section 32 of the vapor flow passage extends upwardly beyond float valve seat 26 to a cross passage 34 which opens into an outlet chamber 36 through a valve seat 38. An outlet opening of chamber 36 communicates directly with a conduit 42 leading to a schematically illustrated refueling vapor canister 44. Communication between cross passage 34 and outlet chamber 36 is normally blocked by a valve head 46 biassed against valve seat 38 as by a spring 48.

A separate fuel flow passage 50 extends through housing 10 to open at its lower end into fill pipe 12. The open upper end of fuel passage 50 receives a cup shaped insert 52 having an opening 54 through its lower wall which mounts an annular seal 56. A trap door like plate 58 is hingedly mounted on insert 52 as at 60 and is normally biassed by a torsion spring, not shown, to the closed position shown in FIG. 1 in which the plate 58 sealingly engages the inner side of annular seal 56 to seal fuel passage 50 from atmosphere at the open upper end of the housing. Insert 52 is formed with an internal thread 62 to threadably receive a conventional fill pipe closure cap, not shown.

The internal diameter of annular seal 56 is dimensioned to slidably and sealingly receive the tubular fuel dispensing nozzle of a conventional service station fuel pump. Such nozzles are made to a standard outer diameter. Insertion of such a nozzle through seal 56 will hinge the trap door plate 58 to the broken line position indicated at 58a in FIG. 1, and in moving to this latter position, the plate 58 will engage an actuating stem 64 fixed to valve head 46 and slidably received within housing 10 to shift valve head 46 to the left as viewed in FIG. 1 clear of seat 38 to place cross passage 34 and outlet chamber 36 in communication with each other. Fuel dispensed from the nozzle into tank 14 via fill pipe 12 will displace fuel vapor in the head space of the tank, and this displaced vapor will flow upwardly through the interior 22 of outer hose 18 and thence through discriminator 30, past float valve 28 through passages 32, 34 and past the opened valve head 46 into outlet chamber 36 and thence via conduit 42 to canister 44.

The seal between annular seal 56 and the fuel dispensing nozzle prevents vapor from flowing from fuel passage 50 past seal 56 to atmosphere.

To prevent an undue increase in pressure in fuel passage 50 in the event the fuel tank is inadvertently overfilled, an emergency pressure relief valve designated generally 66 is incorporated in housing 10. A port 66 through a wall of fuel passage 50 is normally closed by a valve head 70 biassed to seal port 66 by a spring 72. If the pressure within passage 50 rises to a pressure sufficient to overcome spring 72 and displace valve head 70 from port 66, fuel in passage 50 can flow through the open port 66 into a chamber 74 which opens into cup-shaped insert 52 above seal 56 via port 76. Fuel thus vented from passage 50 will spill from the open end of insert 52 to prevent fill pipe 12 and tank 14 from being overpressurized.

Referring now to FIG. 4, fuel passage 50 can communicate with vapor outlet chamber 36 via a vapor vent passage having an inlet 78 opening into fuel passage 50. A float ball 80 is loosely received within a passage 82 having a relatively small outlet 84 which can be blocked by ball 80 if ball 80 is seated at passage 84 by the flow of liquid fuel into passage 82 via inlet 78. Ball 80 will remain in the position shown to permit the free flow of vapor through passage 82 and passage 84 and thence via a passage 86 into chamber 36, but will be seated to prevent liquid fuel from flowing into passage 84.

Operation of the fill neck assembly of FIGS. 1-4 is as follows.

The upper or inlet end of fuel passage 50 is normally closed by a closure cap, not shown, threaded onto thread 62 and is sealed against the discharge of fuel vapor from fill pipe 12 by trap door plate 58 which is normally seated in the position shown in FIG. 1 against the inner side of annular seal 56.

In a refueling operation, the insertion of the standard fuel dispensing nozzle through seal 54 swings trap door plate 58 to the broken line position shown in FIG. 1 at 58a, and the hinging plate engages actuating stem 64 of valve head 46 to lift valve head 46 clear of its seat 38, thereby placing cross passage 34 in direct communication with outlet chamber 36. Fuel dispensed from the inserted nozzle passes into tank 14 via fill pipe 12 and the incoming fuel displaces fuel vapor from the head space of the tank upwardly through passage 22, and through housing 10 via passage 24, 32, 34 and chamber 36 to outlet 40. From outlet 40, the vapor passes via conduit 42 to the refueling vapor canister 44, this canister having sufficient capacity to receive all vapor displaced from tank 14 during the refueling operation.

As the tank is filled, fuel eventually will back up from the filled tank both in passage 22 and in the interior of fill pipe 12. The rising fuel in vapor passage 22 is retarded by discriminator 30 so that in the normal course of events, fuel will rise in fill pipe 12 and fuel passage 50 to actuate the conventional automatic shutoff incorporated in standard fuel dispensing nozzles to terminate refueling before float valve 28 is lifted by the rising fuel in passage 24 to seat on seat 26. Subsequent withdrawal of the nozzle from seal 56 enables the trap door plate to return to its original full line position as shown in FIG. 1, and as the plate hinges back to its closed position, valve head 46 is returned to seal 38 by spring 48.

The vapor transferred to canister 44 by this operation is subsequently metered to the intake manifold 88 of the vehicle engine by the purge system schematically indicated at 90, such metering action being well known in the prior art.

In the event the automatic nozzle shutoff should fail to function and fuel continues to flow under pressure into passage 50 from the nozzle, float valve 28 will seat upon seat 26, if it is not already done so, and pressure in fuel passage 50 will rapidly rise. Emergency pressure relief valve 66 will open to relieve this pressure by venting fuel from fuel passage 60 through chamber 74 and port 76 to spill, hopefully promptly alerting the attendant to the malfunction.

The modified form of fill neck assembly shown in FIG. 5 includes many components in common with the previously described fill neck assembly of FIGS. 1-4. Corresponding reference numerals followed by a subscript "a" are employed in FIG. 5 to identify such common elements.

The fill neck assembly of FIG. 5 includes a housing 10a formed with an internal vapor flow passage 24a within which is positioned a vapor-liquid discriminator 30a, float 28a and float valve seat 26a in the same relationship to each other as disclosed in FIG. 1.

The housing 10a is also formed with a fuel flow passage 50a provided at its upper or inlet end with an annular nozzle seal 56a and spring biassed trap door plate 58a in the same relationship to each other as the corresponding elements of the previously described FIG. 1 embodiment.

As in the FIG. 1 embodiment, the fill neck assembly of FIG. 5 includes a spring biassed emergency pressure relief valve 66a actuable to allow fuel to spill from the inlet end of the fill neck assembly via ports 68a 76a in the event of the existence of an overpressure within fuel passage 50a, as in the case of an automatic nozzle shutoff malfunction.

As in the case of the FIG. 1 embodiment, housing 10a is formed with a vapor vent passage having an inlet 78a opening into fuel passage 50a and a relatively lightweight ball 80a retained between inlet 78a and a small diameter outlet 82a which opens into a passage 86a. As in the previously described embodiment, ball 80a will not interfere with the flow of vapor from inlet 78a to outlet 82a, but will seat in outlet 82a in the event liquid fuel attempts to flow from fuel passage 50a to vent passage 86a. Vent passage 86a communicates directly with the vapor valve outlet passage 40a.

As in the previous case, housing 10a is connected to the vehicle fuel tank fill pipe 12a and an outer hose 18a is connected to the lower end of housing 10a so that the vehicle fuel tank may be filled with fuel passing through fill pipe 12a and fuel vapor displaced from the tank by the incoming fuel can flow into vapor passage 24a via the vapor passage defined between outer hose 18a and fill pipe 12a.

The components of the FIG. 5 embodiment described thus far function identically to the corresponding components described in greater detail in connection with the FIG. 1 embodiment.

The primary difference between the embodiment of FIG. 5 and that of FIGS. 1-4 is that the vapor valve of the FIG. 5 embodiment is pressure actuated in response to the vapor pressure in vapor passage 24a as opposed to the mechanically actuated valve head 46 of the FIG. 1 embodiment. In the FIG. 5 embodiment, the reduced diameter vapor passage section 32a above float valve seat 26a leads into a cross passage 34a which extends through an open ended hollow tubular portion 100. A flexible diaphragm 102 is sealed around its periphery to housing 10a and is normally biassed into seated engagement with the open end of tubular portion 100, as by a spring 104, to block communication between cross passage 34a and an annular outlet chamber 36a generally surrounding tubular portion 100. Spring 104 exerts a relatively light biassing action so that when the pressure in cross passage 34a rises above atmospheric pressure by a slight amount, diaphragm 102 will be unseated from tubular portion 100 so that vapor can flow from passage 34a into outlet chamber 36a and thence through passage 40a to a refueling vapor canister, such as canister 44 in FIG. 1.

As compared to the fill neck assembly of FIG. 1, the fill neck assembly of FIG. 5 will permit the flow of fuel vapor from the head space of the vehicle fuel tank to a vapor receiving canister at any time when the pressure of fuel vapor in the tank, and hence passage 34a, exceeds atmospheric pressure by an amount sufficient to overcome the biassing force of spring 104. Such venting of fuel vapor from the tank to the canister can occur whether a refueling operation is in progress or not. In the FIG. 1 embodiment, the fill neck assembly affords communication between the head space of the fuel tank and refueling vapor canister only when a fuel dispensing nozzle is inserted into the fill neck. In the system of FIG. 1, venting of fuel vapor from the head space of the fuel tank during normal operation of the vehicle requires a second vapor handling system, such as the prior art "running vapor" canister systems referred to in the BACKGROUND OF THE INVENTION section of this application.

While two embodiments of the invention have been described in detail, it will be apparent to those skilled in the art the disclosed embodiments may be modified. Therefore, the foregoing description is to be considered exemplary rather than limiting, and the true scope of the invention is that defined in the following claims.

We claim:

1. In an on board refueling vapor recovery system for preventing fuel vapor displaced from the head space of a vehicle fuel tank during a refueling operation from being discharged into the atmosphere, said system comprising fill pipe means for conducting fuel dispensed from a standard tubular fuel dispensing nozzle into said tank, a fuel vapor canister mounted on said vehicle for receiving fuel vapor, and fuel vapor passage means for conducting fuel vapor displaced from the head space of said tank by incoming fuel from the head space of said tank into said canister;

the improvement wherein said fill pipe means comprises a fill neck housing having a fuel passage extending therethrough from an inlet to an outlet, annular seal means adjacent the inlet of said fuel passage for slidingly sealingly receiving a standard fuel dispensing nozzle inserted into said inlet to seal said fuel passage from atmosphere while accommodating the flow of fuel from said nozzle into said fuel passage via said inlet, and fill pipe means sealed to said housing for conducting fuel from said fuel passage into said tank, and said vapor passage means comprises an outer conduit sealed at its upper end to said housing and sealed at its lower end to said tank and opening into the head space of said tank, said outer conduit loosely surrounding said fill pipe means to define a vapor passage from said tank to said housing at the exterior of said fill pipe means, means defining a second passage extending through said housing from a vapor inlet opening into said vapor passage to a vapor outlet communicating with said canister, and float valve means in said second passage operable to accommodate the flow of vapor through said second passage and to prevent the flow of fuel from said vapor inlet to said vapor outlet, said improvement further comprising normally closed vapor valve means operable when closed to block the flow of vapor in said second passage between said float valve means and said vapor outlet and movable to an open position in response to the commencement of a refueling operation.

2. The invention defined in claim 1 wherein said vapor valve means comprises means for moving said vapor valve means to said open position in response to the insertion of said nozzle into said annular seal means.

3. The invention defined in claim 1 wherein said vapor valve means comprises pressure responsive valve means movable to said open position in response to a predetermined pressure of fuel vapor from the head space of said tank.

4. In an on board refueling vapor recovery system for preventing fuel vapor displaced from the head space of a vehicle fuel tank during a refueling operation from being discharged into the atmosphere, said system comprising fill pipe means for conducting fuel dispensed from a standard tubular fuel dispensing nozzle into said tank, a fuel vapor canister mounted on said vehicle for receiving fuel vapor, and fuel vapor passage means for conducting fuel vapor displaced from the head space of said tank by incoming fuel from the head space of said tank into said canister;

the improvement wherein said fill pipe means comprises a fill neck housing having a fuel passage extending therethrough from an inlet to an outlet, annular seal means adjacent the inlet of said fuel passage for slidingly sealingly receiving a standard fuel dispensing nozzle inserted into said inlet to seal said fuel passage from atmosphere while accommodating the flow of fuel from said nozzle into said fuel passage via said inlet, and fill pipe means sealed to said housing for conducting fuel from said fuel passage into said tank, and said vapor passage means comprises an outer conduit sealed at its upper end to said housing and sealed at its lower end to said tank and opening into the head space of said tank, said outer conduit loosely surrounding said fill pipe means to define a vapor passage from said tank to said housing at the exterior of said fill pipe means, means defining a second passage extending through said housing from a vapor inlet opening into said vapor passage to a vapor outlet communicating with said canister, and float valve means in said second passage operable to accommodate the flow of vapor through said second passage and to prevent the flow of fuel from said vapor inlet to said vapor outlet, said improvement further comprising vapor-liquid discriminator means in said second passage between said inlet and said float valve means operable to retard the flow of liquid fuel while accommodating a substantially unrestricted flow of fuel vapor.

5. In an on board refueling vapor recovery system for preventing fuel vapor displaced from the head space of a vehicle fuel tank during a refueling operation from being discharged into the atmosphere, said system comprising fill pipe means for conducting fuel dispensed from a standard tubular fuel dispensing nozzle into said tank, a fuel vapor canister mounted on said vehicle for receiving fuel vapor, and fuel vapor passage means for conducting fuel vapor displaced from the head space of said tank by incoming fuel from the head space of said tank into said canister;

the improvement wherein said fill pipe means comprises a fill neck housing having a fuel passage extending therethrough from an inlet to an outlet, annular seal means adjacent the inlet of said fuel passage for slidingly sealingly receiving a standard fuel dispensing nozzle inserted into said inlet to seal said fuel passage from atmosphere while accommodating the flow of fuel from said nozzle into said fuel passage via said inlet, and fill pipe means sealed to said housing for conducting fuel from said fuel passage into said tank, and said vapor passage means comprises an outer conduit sealed at its upper end to said housing and sealed at its lower end to said tank and opening into the head space of said tank, said outer conduit loosely surrounding said fill pipe means to define a vapor passage from said tank to said housing at the exterior of said fill pipe means, means defining a second passage extending through said housing from a vapor inlet opening into said vapor passage to a vapor outlet communicating with said canister, and float valve means in said second passage operable to accommodate the flow of vapor through said second passage and to prevent the flow of fuel from said vapor inlet to said vapor outlet, said improvement further comprising emergency pressure relief valve means in said housing for venting said flow passage to atmosphere when the pressure in said flow passage exceeds a predetermined emergency pressure.

6. In an on board refueling vapor recovery system for preventing fuel vapor displaced from the head space of a vehicle fuel tank during a refueling operation from being discharged into the atmosphere, said system comprising fill pipe means for conducting fuel dispensed from a standard tubular fuel dispensing nozzle into said tank, a fuel vapor canister mounted on said vehicle for receiving fuel vapor, and fuel vapor passage means for conducting fuel vapor displaced from the head space of said tank by incoming fuel from the head space of said tank into said canister;

the improvement wherein said fill pipe means comprises a fill neck housing having a fuel passage extending therethrough from an inlet to an outlet, annular seal means adjacent the inlet of said fuel passage for slidingly sealingly receiving a standard fuel dispensing nozzle inserted into said inlet to seal said fuel passage from atmosphere while accommodating the flow of fuel from said nozzle into said fuel passage via said inlet, and fill pipe means sealed to said housing for conducting fuel from said fuel passage into said tank, and said vapor passage means comprises an outer conduit sealed at its upper end to said housing and sealed at its lower end to said tank and opening into the head space of said tank, said outer conduit loosely surrounding said fill pipe means to define a vapor passage from said tank to said housing at the exterior of said fill pipe means, means defining a second passage extending through said housing from a vapor inlet opening into said vapor passage to a vapor outlet communicating with said canister, and float valve means in said second passage operable to accommodate the flow of vapor through said second passage and to prevent the flow of fuel from said vapor inlet to said vapor outlet, said improvement further comprising fuel passage vent means in said housing for venting fuel vapor from said fuel passage into said vapor outlet of said second passage.

7. The invention defined in claim 6 further comprising means in said vent passage means for blocking the flow of liquid fuel from said fuel passage to said vapor outlet via said vent passage means.

8. In an on board refueling vapor recovery system for preventing fuel vapor displaced from the head space of a vehicle fuel tank during a refueling operation from being discharged into the atmosphere, said system comprising fill pipe means for conducting fuel dispensed from a standard tubular fuel dispensing nozzle into said tank, a fuel vapor canister mounted on said vehicle for receiving fuel vapor, and fuel vapor passage means for conducting fuel vapor displaced from the head space of said tank by incoming fuel from the head space of said tank into said canister;

the improvement wherein said fill pipe means comprises a fill neck housing having a fuel passage extending therethrough from an inlet to an outlet, annular seal means adjacent the inlet of said fuel passage for slidingly sealingly receiving a standard fuel dispensing nozzle inserted into said inlet to seal said fuel passage from atmosphere while accommodating the flow of fuel from said nozzle into said fuel passage via said inlet, and fill pipe means sealed to said housing for conducting fuel from said fuel passage into said tank, and said vapor passage means comprises an outer conduit sealed at its upper end to said housing and sealed at its lower end to said tank and opening into the head space of said tank, said outer conduit loosely surrounding said fill pipe means to define a vapor passage from said tank to said housing at the exterior of said fill pipe means, means defining a second passage extending through said housing from a vapor inlet opening into said vapor passage to a vapor outlet communicating with said canister, and float valve means in said second passage operable to accommodate the flow of vapor through said second passage and to prevent the flow of fuel from said vapor inlet to said vapor outlet, said improvement further comprising a trap door like plate hingedly mounted in said fuel passage adjacent said annular seal means at the side of said seal means remote from said inlet, means biassing said plate to a closed position against said seal means to seal said fuel passage from atmosphere, said plate being hingable to an open position by the insertion of said nozzle inwardly through said annular seal means, vapor valve means in said second passage between said float valve means and said vapor outlet, spring means biassing said vapor valve means to a closed position blocking communication between said float valve means and said vapor outlet, and actuating means operable when said plate is in its open position to maintain said vapor valve means in an open position placing said float valve means in communication with said vapor outlet.

9. The invention defined in claim 8 further comprising vent passage means for venting fuel vapor from said fuel passage into said second passage.

10. In an on board refueling vapor recovery system for preventing fuel vapor displaced from the head space of a vehicle fuel tank during a refueling operation from being discharged into the atmosphere, said system comprising fill pipe means for conducting fuel dispensed from a standard tubular fuel dispensing nozzle into said tank, a fuel vapor canister mounted on said vehicle for receiving fuel vapor, and fuel vapor passage means for conducting fuel vapor displaced from the head space of said tank by incoming fuel from the head space of said tank into said canister;

the improvement wherein said fill pipe means comprises a fill neck housing having a fuel passage extending therethrough from an inlet to an outlet, annular seal means adjacent the inlet of said fuel passage for slidingly sealingly receiving a standard fuel dispensing nozzle inserted into said inlet to seal said fuel passage from atmosphere while accommodating the flow of fuel from said nozzle into said fuel passage via said inlet, and fill pipe means sealed to said housing for conducting fuel from said fuel passage into said tank, and said vapor passage means comprises an outer conduit sealed at its upper end to said housing and sealed at its lower end to said tank and opening into the head space of said tank, said outer conduit loosely surrounding said fill pipe means to define a vapor passage from said tank to said housing at the exterior of said fill pipe means, means defining a second passage extending through said housing from a vapor inlet opening into said vapor passage to a vapor outlet communicating with said canister, and float valve means in said second passage operable to accommodate the flow of vapor through said second passage and to prevent the flow of fuel from said vapor inlet to said vapor outlet, said improvement further comprising a trap door like plate hingedly mounted in said fuel passage adjacent said annular seal means at the side of said seal means remote from said inlet, means biassing said plate to a closed position against said seal means to seal said fuel passage from atmosphere, said plate being hingable to an open position by the insertion of said nozzle inwardly through said annular seal means, pressure responsive vapor valve means in said second passage between said float valve means and said vapor outlet normally maintained in a closed position blocking the flow of fuel vapor to said vapor outlet and movable to an open position to accommodate flow of fuel vapor to said vapor outlet when the pressure of fuel vapor in said second passage exceeds a predetermined pressure.

11. The invention defined in claim 10 wherein said vapor valve means comprises means defining a chamber in said housing constituting a portion of said second passage, said chamber having an inlet communicating with said float valve means and an outlet communicating with said vapor outlet, a flexible diaphragm defining a wall of said chamber opposite the inlet to said chamber, and spring means biassing said diaphragm to a closed position blocking said inlet, said diaphragm being movable to an open position accommodating flow into the chamber via the chamber inlet when the pressure at the chamber inlet exceeds said predetermined pressure.

12. A fill neck assembly for a vehicle on board refueling vapor recovery system which directs fuel vapor displaced from the vehicle fuel tank during a refueling operation to a vapor canister so as to prevent the vapor from being discharged into the atmosphere, said assembly comprising a housing having a fuel passage therein with an inlet end for receiving a fuel dispensing nozzle and an outlet end, said inlet end having a nozzle seal to enable fuel to be discharged from the nozzle into the fuel passage while preventing fuel vapor from being discharged from the fuel passage into the atmosphere, said outlet end being connected to a pair of parallel passages connected to the head space of the fuel tank, one of said passages being a fuel fill passage through which fuel from the nozzle flows to the tank and the other of said passages being a vapor passage through which vapor from the tank head space flows to the canister, said pair of passages being isolated from one another at said housing, said vapor passage having a vapor-liquid discriminator for separating liquid fuel from the vapor so as to prevent liquid fuel from entering the cannister.

13. The assembly of claim 12, wherein a float valve and valve seat are provided in said vapor passage downstream of said discriminator to close said vapor passage to flow of liquid fuel upon overfill.

14. The assembly of claim 12, wherein a normally-closed vapor valve is provided at the vapor outlet end of said vapor passage.

15. The assembly of claim 12, wherein means are provided whereby said vapor valve is opened by insertion of the fuel nozzle.

16. The assembly of claim 12, wherein means are provided whereby said vapor valve is opened when the vapor pressure exceeds a set pressure.

17. The assembly of claim 12, wherein a second vapor vent is provided to continuously vent vapor from said fuel passage of said housing, so as to prevent discharge of vapor and/or liquid fuel from said housing when the fuel nozzle is withdrawn therefrom after refueling is completed.

18. The assembly of claim 12, wherein a second vapor vent is provided to vent vapor from said fuel passage of said housing when vapor pressure exceeds a set pressure.

19. The assembly of claim 17 or claim 18, wherein said vent is connected to the vapor cannister and wherein a float valve and valve seat are provided in said second vent to prevent flow of liquid fuel to the cannister on over fill.

20. The assembly of claim 12, wherein an emergency pressure relief valve is provided in said housing arranged to bypass said nozzle seal to permit liquid fuel from said housing on over fill or malfunction of the conventional nozzle shut-off.

* * * * *